(No Model.)
G. W. CHANDLER & J. C. DALE.
CAR BRAKE.
No. 517,916. Patented Apr. 10, 1894.
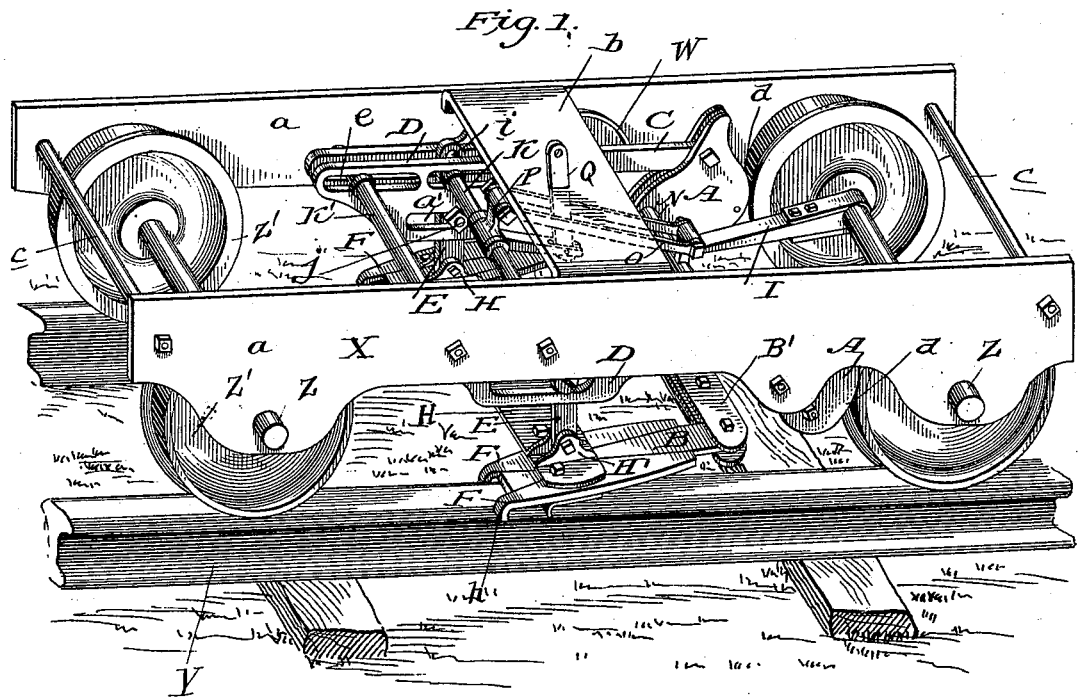
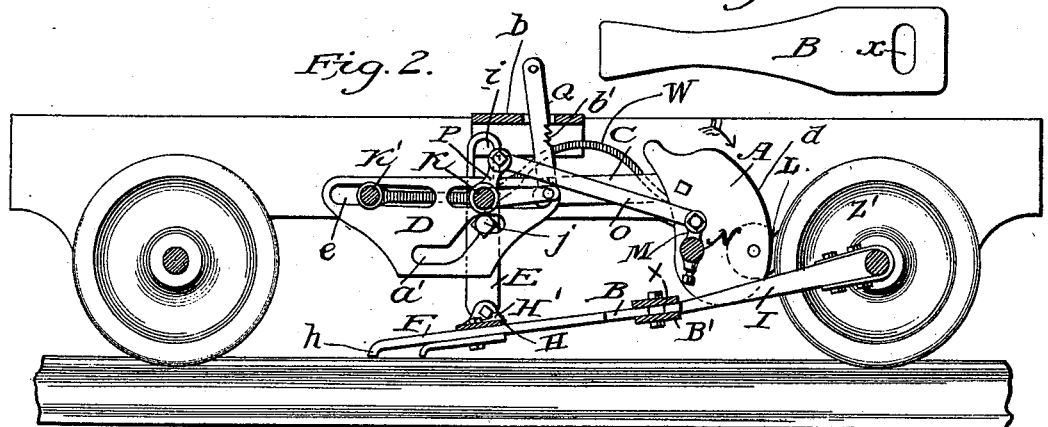
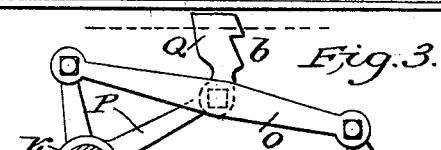
Witnesses:
O. C. Barner
J. M. Wood
Inventors:
Geo. W. Chandler
John C. Dale

UNITED STATES PATENT OFFICE.

GEORGE W. CHANDLER AND JOHN C. DALE, OF MANHATTAN, KANSAS.

CAR-BRAKE.

SPECIFICATION forming part of Letters Patent No. 517,916, dated April 10, 1894.

Application filed July 14, 1893. Serial No. 480,548. (No model.)

*To all whom it may concern:*

Be it known that we, GEORGE W. CHANDLER and JOHN C. DALE, citizens of the United States, residing at Manhattan, in the county of Riley and State of Kansas, have invented certain new and useful Improvements in Car-Brakes; and we do declare the following to be a full, clear, and exact description of the invention, such as will enable others skilled in the art to which it appertains to make and use the same.

Our invention relates to improvements in car brakes, and it has for its general object to provide a combined wheel and track brake of a simple and highly efficient construction and one which will serve effectually to quickly stop a car upon a heavy grade as well as upon a level.

Other objects and advantages of the invention will be fully understood from the following description and claims when taken in connection with the annexed drawings, in which—

Figure 1, is a perspective view illustrating our improved brake as applied to a car truck or frame. Fig. 2, is a longitudinal section of the same. Fig. 3, is a detail view illustrating the train of levers through the medium of which the track clutches are lowered to an operative position and the friction shoes are moved into engagement with the wheels. Fig. 4, is a similar view of one of the friction springs, and Fig. 5, is an enlarged plan view of one of the wedges for binding the clutches against the track rails.

Referring by letter to said drawings:—X, indicates a car truck or frame which may be of any approved form and construction, but which is here shown as comprising the side bars $a$, a bridge or cross bar $b$, and a series of connecting rods as $c$.

Y, indicates track rails; and Z, indicates axles which are journaled in the side bars of the truck or frame X, and carry traveling wheels Z', as shown. The said side bars $a$, of the truck or frame X, afford bearings for the transverse rock shaft N, of our improved brake; and upon this shaft N, are fixedly mounted the friction brake shoes A, which are designed to engage the peripheries of the rear wheels Z'. These shoes A, are provided with compound-curved engaging faces $d$, as illustrated, and they are provided in their lower portion which is curved convexly with anti-friction wheels L, designed and adapted to normally bear against the peripheries of the wheels Z', as better shown in Fig. 2. The shaft N, is provided, preferably at its middle, with a crank M, and this crank is connected by a link O, with one arm of a bell-crank-lever P, which is mounted upon a transverse shaft as K, and has its opposite arm connected to a link or pitman Q, as illustrated. This link or pitman Q, extends through an opening in the cross-bar $b$, of the frame and has one or more rack teeth $b'$, to engage said cross bar so as to lock the shoes A, in their normal position, and it is designed, in practice, to be connected to a lever or system of levers (not illustrated) which may be employed to move the parts of our improved brake into and out of operation as will be presently explained.

K', indicates a transverse shaft which is arranged in the same plane as the shaft K; and D, indicates slidable blocks which are provided with slots $e$, to receive the said shafts K, K', upon which they are mounted. These slidable blocks D, have their rear ends connected to the upper portions of the shoes A, by links or pitmen as C, and they are respectively provided with a cam groove $a'$, which preferably comprises a straight and horizontal forward portion and an upwardly and rearwardly curved rear portion, for a purpose presently disclosed.

F, indicates the rail engaging clutches of which there are two employed in conjunction with each rail. These clutches F, are provided with the depending branches $h$, and have their inner sides curved convexly as shown in Fig. 1, and they are pivotally connected at an intermediate point of their length to the transverse, vertically-movable bar H, which in turn is connected with the shaft K, by the straps or arms E. These straps or arms E, are pivotally connected to the lugs H', upon the bar H, and are slotted longitudinally as shown at $i$, to receive the shaft K; and they are provided with lateral gudgeons as $j$, which are designed to move in the cam slots $a'$, of the blocks D, so that when said blocks are drawn rearwardly by the action of the wheels upon the shoes A, the bar H, will be permitted to fall so as to carry the clutches into positions upon opposite sides of the rails.

B, indicates wedges which are designed and adapted to move between the clutches F, so as to bind and hold the forward ends of the same against the rails. These wedges B, are provided adjacent to their rear ends with transverse slots x, and they are connected to a transverse bar B′, by bolts which take through the said slots, whereby it will be seen that the wedges are free to accommodate themselves to the clutches. The cross-bar B′, is connected to the rear axle Z, by arms as I, which serve to normally hold the bar B′, and the wedges in the position illustrated in Figs. 1, and 2.

In the practical operation of the invention, the link or pitman Q, is held in engagement with the cross bar b, so as to normally hold the shoes A, and the other parts in the positions illustrated in Fig. 2. Now when it is desired to stop the car in going down a grade or on a level, it is simply necessary to release the link or pitman Q, when the wheels will draw the shoes A, in the direction indicated by the arrow and will be braked thereby. The movement of the shoes A, in the direction indicated will draw the blocks D, in a rearward direction so as to allow the clutches F, to fall and assume positions upon opposite sides of the rails, and the forward movement of the clutches being retarded by their engagement with the rails, the wedges will move forwardly between them and will bind them tightly against the rail so as to effect a quick stop no matter how heavy the grade. When the car stops upon a heavy grade, it will be perceived that should it move backward down the hill in the direction indicated by the arrow in Fig. 1, the brakes will be automatically applied by the wheels forcing down the shoes A, and it will also be seen that when the car is again started in the direction in which it is moving, the brakes will be automatically released.

To release the brakes when the car is traveling down a grade or upon a level, it is simply necessary to raise the link or pitman Q, so as to cause the several parts to assume the positions shown in Fig. 2, and then place said link or pitman in engagement with the bar b, as before described.

In order to render the movements of the shoes A, more steady and firm, we prefer to employ the friction springs W, which are connected to the shafts K, K′, and bear against the shaft N.

It will be noted from the foregoing description taken in connection with the drawings that our improved brake is very simple and effective for the purposes stated, and that it is strong and durable and is well able to withstand rough usage.

Having described our invention, what we claim is—

1. In a car brake, the combination of a brake shoe adapted to be moved by a wheel, a clutch adapted to engage a rail, and mechanism intermediate of the shoe and the clutch adapted to lower the clutch when the shoe is moved, substantially as specified.

2. A car brake comprising a brake shoe adapted to engage a wheel, a clutch adapted to engage a rail, and mechanism adapted to bind the clutch against the rail, after the speed of the car has been slackened by the application of the shoe to the wheel, substantially as specified.

3. In a car brake, the combination of a swinging brake shoe adapted to engage a wheel, a slidable block connected and adapted to move with the brake shoe and having a cam groove, a clutch adapted to engage a rail and an arm connected to the clutch and engaging the cam groove of the slide block, whereby when the shoe is moved to brake the wheel, the clutch will be lowered to an operative position, substantially as specified.

4. A car brake comprising a movable brake shoe adapted to engage a wheel, a clutch adapted to engage a rail, mechanism intermediate of the shoe and the clutch adapted to lower the clutch when the shoe is moved, and mechanism adapted to bind the clutch against a rail to stop the car, substantially as and for the purpose set forth.

5. In a car brake, the combination of a swinging brake shoe adapted to engage a wheel, a clutch adapted to engage a rail, a slidable block connected and adapted to move with the shoe and having a cam groove, an arm connected with the clutch and engaging the cam groove of the slidable block, and a wedge adapted to bind the members of the clutch against the rail, substantially as specified.

6. In a car brake, the combination with a wheel; of a pivotally mounted brake shoe having a compound curved engaging face and also having an anti-friction wheel adapted to normally engage the wheel, and a suitable means for adjusting the said shoe.

7. In a car brake, the combination of the pivotally mounted brake shoes adapted to engage wheels, the clutches adapted to engage the rails and respectively comprising two pivotally-mounted members, slidable blocks connected and adapted to move with the brake shoes, and having cam grooves-swinging arms connected with the clutches and engaging the cam grooves of the slidable blocks, wedges adapted to bind the clutches against the rails when the speed of the car is slackened by the application of the shoes to the wheels, and a suitable means for normally holding the shoes and the clutches out of engagement with the wheels and rails, respectively, substantially as and for the purpose set forth.

In testimony whereof we affix our signatures in presence of two witnesses.

GEORGE W. CHANDLER.
JOHN C. DALE.

Witnesses:
O. C. BARNER,
S. A. SAWYER.